UNITED STATES PATENT OFFICE.

JACOB HELBER, OF FARMINGTON, MISSOURI.

IMPROVEMENT IN FLY-TRAPS.

Specification forming part of Letters Patent No. 185,231, dated December 12, 1876; application filed August 4, 1876.

*To all whom it may concern:*

Be it known that I, JACOB HELBER, of Farmington, in the county of St. Francois and State of Missouri, have invented certain new and useful Improvements in Fly-Traps; and I do hereby declare that the following is a full, clear, and exact description thereof, which will enable others skilled in the art to which it appertains to make and use the same, reference being had to the accompanying drawing, and the letters of reference marked thereon, which forms a part of this specification, and which represents a side elevation, partly in section, of my improved fly-trap.

A is a dish, made of sheet metal, glass, porcelain, or other suitable material. It is provided with feet $e$ $e$, which elevate it slightly from the floor or table upon which it is placed. D is a cover, made of wire gauze, netting, or other similar material, and which fits closely on top of dish A, which latter is provided with a rim or flange, $b$, for this purpose. The bottom $a$ of dish A has in the center a perforation, $c$, above which is secured a tube, B, cylindrical, or nearly so, and the height of which is about equal to that of the sides of dish A. In this manner a channel, C, is formed between the outer walls of tube B and the inner walls of dish A.

In operation I fill the channel C with soap-water or lye, and place the trap in the room infested with flies. Under it may be placed a few grains of sugar as bait. The flies, attracted by the sugar, will ascend through tube B and into the trap, where, after striking against the wire cover, they fall into the soap-water.

I am aware that fly-traps have been constructed before on a principal similar to mine; but the equivalent of my tube B has invariably been made in the shape of a cone, the base of which has covered the entire bottom of the dish, or nearly so. The result has been that the greater number of flies have been permitted to escape by crawling out of the water upon the slanting sides of the cone. Besides, the channel for holding the water has naturally been of very limited capacity, thus necessitating the frequent renewal of the water.

Having thus described my invention, I claim and desire to secure by Letters Patent of the United States—

The fly-trap herein described, consisting of dish or pan A, provided with flange $b$ to receive the wire cover D, feet $e$, and centrally-perforated bottom $a$, and having in the center the cylindrical tube B, substantially as and for the purpose herein shown and specified.

JACOB HELBER.

Witnesses:
HENRY CARLETON,
ELLIS P. CAYCE.

J. HEPPERLY.
BRACKETS FOR WATER-COOLERS.

No. 185,232. Patented Dec. 12, 1876.

Figure 1:
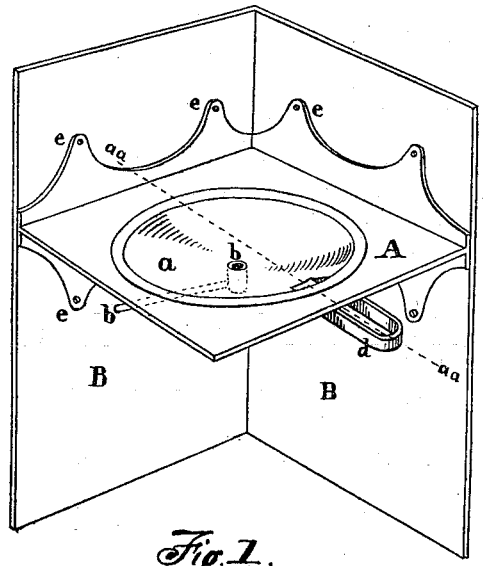
Figure 2:
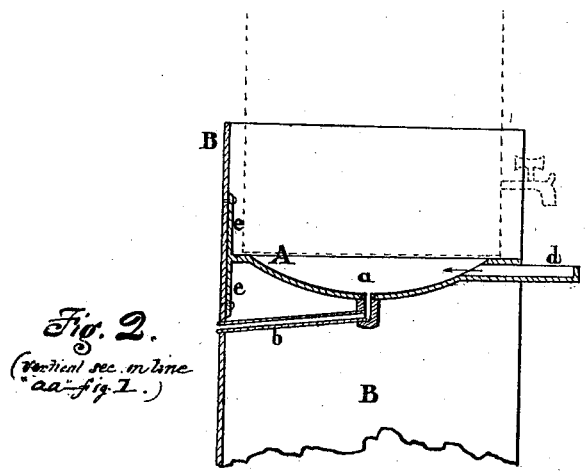

(Vertical sec. on line *aa* fig. 1.)

Witnesses
Clarence Thurlow
Marin Jones

Jacob Hepperly
by E. Thurlow his atty.
in fact.

THE GRAPHIC CO. N.Y.